(12) United States Patent
Kleemola et al.

(10) Patent No.: US 7,050,910 B2
(45) Date of Patent: May 23, 2006

(54) METHOD AND SYSTEM FOR ANALYZING SITE-SPECIFIC GROWTH FACTORS LIMITING PRODUCTION

(75) Inventors: Jouko Kleemola, Hyvinkää (FI); Pekka Korhonen, Espoo (FI); Jari Peltonen, Lahela (FI); Iikka Saarelainen, Helsinki (FI); Jukka Sinisalo, Helsinki (FI)

(73) Assignee: Kemira Growhow Oy, Helsinki (FI)

( * ) Notice: Subject to any disclaimer, the term of this patent is extended or adjusted under 35 U.S.C. 154(b) by 22 days.

(21) Appl. No.: 10/737,743

(22) Filed: Dec. 18, 2003

(65) Prior Publication Data

US 2005/0137803 A1   Jun. 23, 2005

(51) Int. Cl.
*G06Q 10/00* (2006.01)

(52) U.S. Cl. ......................................................... 702/2
(58) Field of Classification Search ................... 702/2, 702/3, 5; 705/7, 8, 9, 10, 11
See application file for complete search history.

(56) References Cited

U.S. PATENT DOCUMENTS

| | | | |
|---|---|---|---|
| 5,566,069 A | | 10/1996 | Clark, Jr. et al. |
| 5,870,689 A | | 2/1999 | Hale et al. |
| 6,002,984 A | * | 12/1999 | Aughenbaugh ................ 702/2 |
| 6,029,106 A | * | 2/2000 | Hale et al. ..................... 701/50 |
| 6,738,774 B1 | * | 5/2004 | Uthe et al. ..................... 707/10 |
| 6,745,127 B1 | * | 6/2004 | Crosby ........................... 702/2 |
| 6,820,009 B1 | * | 11/2004 | Sommer ......................... 702/2 |
| 6,865,582 B1 | * | 3/2005 | Obradovic et al. ......... 707/104.1 |
| 2002/0022928 A1 | * | 2/2002 | Ell ................................. 702/2 |
| 2002/0022929 A1 | * | 2/2002 | Ell ................................. 702/5 |
| 2002/0035431 A1 | * | 3/2002 | Ell ................................. 702/5 |
| 2002/0040300 A1 | * | 4/2002 | Ell ................................. 705/1 |

FOREIGN PATENT DOCUMENTS

| | | |
|---|---|---|
| EP | 0 723 391 B1 | 1/2000 |
| EP | 0 797 916 B1 | 7/2001 |
| WO | WO 97/37372 A1 | 10/1997 |

OTHER PUBLICATIONS

Ewald Schnug et al., Site-Specific Management for Agricultural Systems, 1995, pp. 899-908.
K. W. Finlay et al. Aust. J. Agric. Res., 1963, 14, 742-754.

* cited by examiner

*Primary Examiner*—Donald McElheny, Jr.
(74) *Attorney, Agent, or Firm*—Birch, Stewart, Kolasch & Birch, LLP

(57) ABSTRACT

A computer and data network assisted automated method and system for determining factors limiting production locally and site-specifically in agriculture or related industrial fields, and for evaluating the mutual significance thereof by means of an expert system. Feedback comprising a solution is furnished via data network to the system of the production site and/or related industry for further measures.

26 Claims, 3 Drawing Sheets

METHOD AND SYSTEM FOR ANALYZING SITE-SPECIFIC GROWTH FACTORS LIMITING PRODUCTION

BACKGROUND OF THE INVENTION

1. Field of the Invention

The present invention relates to an automated method and a computer and data network assisted system for determining factors limiting production locally and site-specifically in agriculture and related industrial fields, and for evaluating the mutual significance thereof. Further, the invention provides a procedure for adjusting factors found to limit, or otherwise unfavorably affect production to a locally optimum level.

In agriculture such as plant production, farm animal production and forestry, methods used for planning and controlling the production are substantially based on information about the amount of the harvest (for instance dry matter per surface area), milk production per animal unit, or weight increase of an animal per day, or annual growth (for instance solid cubic meters or total logging outturn per surface area), and also about various quality factors having an influence on market values.

Moreover in plant production, controlling the production volume and quality is based on information about soil and the properties thereof such as soil type, soil fertility and factors affecting the water balance thereof. Actual growth may also be measured by means of aerial photographs, growth evaluations on site (using vegetation samples or estimates of point sampling devices) or by estimating any factors reducing production such as pests or plant diseases, nutrient deficiencies, factors affecting the water balance, or air pollution. Similarly in farm animal production, the control is based on information about pedigrees of farm animals in addition to growth, feeding and health data thereof.

2. Description of Related Art

Already at present, different site-specific information relative to agriculture is collected and recorded for future decisions. Such recording is done by land owners, farmers, cattle breeders, agricultural organizations or institutions, industries, or authorities. In agriculture, suitable means for acquiring information are for instance commercial design and expert systems to be used on production sites; for example the Finnish systems Farmit-Wisu, Agrineuvos, LORIS, and international systems RDS and Field Stars, utilized for automatic control of working machines and sampling; and further, EU's IACS (Integrated Administrative and Control System) statistics suitable for the administrative control of the production, for instance in case of subvention decisions.

Combination of above systems for acquiring information has made possible for instance market surveys and advisory services based on cross-tabulation and classification of farmers by data processing.

While relatively abundant site-specific information based on class averages is already available, it is not yet possible to verify the actual biological and agronomical factors having the greatest restricting site-specific influence for instance on the volume or quality of harvests, since sufficiently extensive data covering long enough periods of time, and also combined methods for the analysis thereof are still lacking. For this reason, it is not possible to direct correcting measures to such relevant factors. However, by directing said correcting measures to factors having the greatest restricting site-specific influence on the production, significant increase of the production volume and/or quality thereof could be achieved with available resources.

As an example, addition of nitrogen fertilizers by the farmer to increase the harvest is useless, if the amount of available water is the most significant factor limiting harvest volumes. On the other hand, one of the central ideas of site-specific cultivation that soil is fertilized according to the fertility thereof by applying for instance nitrogen, phosphorus and potassium using site-specifically single nutrient fertilizers is economically not the best alternative notwithstanding the fact that this would technically be possible at present. Site-specific control should more preferably be carried out only for nutrient(s) limiting the volume and/or quality of the harvest. Efficiencies of phosphorus and potassium being relatively low (less than 50%), site-specific application of a fertilizer may be carried out mainly as a corrective measure and as a maintenance fertilization independent of the growth rhythm of the plant, for instance as autumn fertilization before actual seeding. On the contrary, the efficiency of nitrogen is considerably higher (more than 50%), and therefore the site-specific application thereof should preferably be controlled during growth periods according to growth potential.

At present, prior art methods for utilizing acquired information provide a limited possibility to combine quantitative factors site-specifically. Further, no solution exist for the problem of exploiting all known quantitative factors together, and combining them with so-called qualitative factors (for instance information about any sprayed fungicides, influence of soil types or soil processing techniques, or moreover, the use of seeds from farmer's own farm or commercial certified seeds in the production). Utilization of this acquired and recorded data is further limited by the fact that the ability of expert systems used at various production sites to communicate with one another is not adequate for duplex data transfer, particularly not for duplex data transfer from the expert system to the data bank and back again to said expert system. Accordingly, possibility to interaction is lacking almost totally, and for this reason, the analysis of information, verification of site-specific problems, and evaluation of eventual site-specific solutions may not be carried out in a flexible manner.

Prior art applications are disclosed for instance in the following documents: U.S. Pat. No. 5,566,069, U.S. Pat. No. 5,870,689, EP 723391 B1, WO 9737372 and EP 797916 B1. However, these documents mainly focus on acquiring information and observation results at production sites, not on specific processing thereof. For instance the document U.S. 5,566,069 discloses a system for acquisition of agronomical information under field conditions to be recorded in a laptop computer, and transferring such recorded data via an information network to a database. Such systems for acquiring information are known and in common use in this field.

BRIEF DESCRIPTION OF THE INVENTION

Features characterizing the method and system of the present invention are disclosed in the independent claims. Some embodiments of the invention are presented in the dependent claims.

The invention provides a multiplex method and system for collecting and analyzing data allowing efficient processing of extensive site-specific information material to find factors limiting production, that is, so-called bottlenecks, and to recommend correcting procedures. In the method of the invention, a system based on an information network and site-specific data is used permitting the acquisition of site-specific (for instance a farm, field, field section or specified area(s) of said section) information from land owners, industry, and authorities (production information, aerial photos, farmer registries, daily local weather data, etc.) to a data bank. On the basis of said collected information, factors having an influence on the volume and quality of production are analyzed, site-specific order of significance of these factors is estimated, limiting factors that may be influenced by correcting measures are verified, and feedback is furnished as a solution via the information network to the system of the client for practical measures.

An advantage of the invention is the fact that already existing information and information acquisition systems may be combined to find factors limiting production.

The invention is now described in more detail. In this description reference is made to figures wherein

DETAILED DESCRIPTION OF THE INVENTION

In the automated method and system of the invention for determining factors limiting production locally and site-specifically, so-called bottlenecks, in agriculture or related industrial fields and for evaluating the mutual significance thereof on the basis of the data from the data acquisition system of the production site, at least the following operations are carried out:

(i) data collected from the information and/or data acquisition systems of the production site is organized into a data bank of the system according to the present invention to obtain site-specific records, (ii) said data is analyzed by means of the system of the invention, and independent factors having an effect on the production volume and/or quality are determined on the basis of the collected data, (iii) order of significance of the independent factors X from the previous step with respect to a particular, or a dependent factor Y, is determined, and (iv) independent factor(s) limiting the production are selected.

Figure 2:
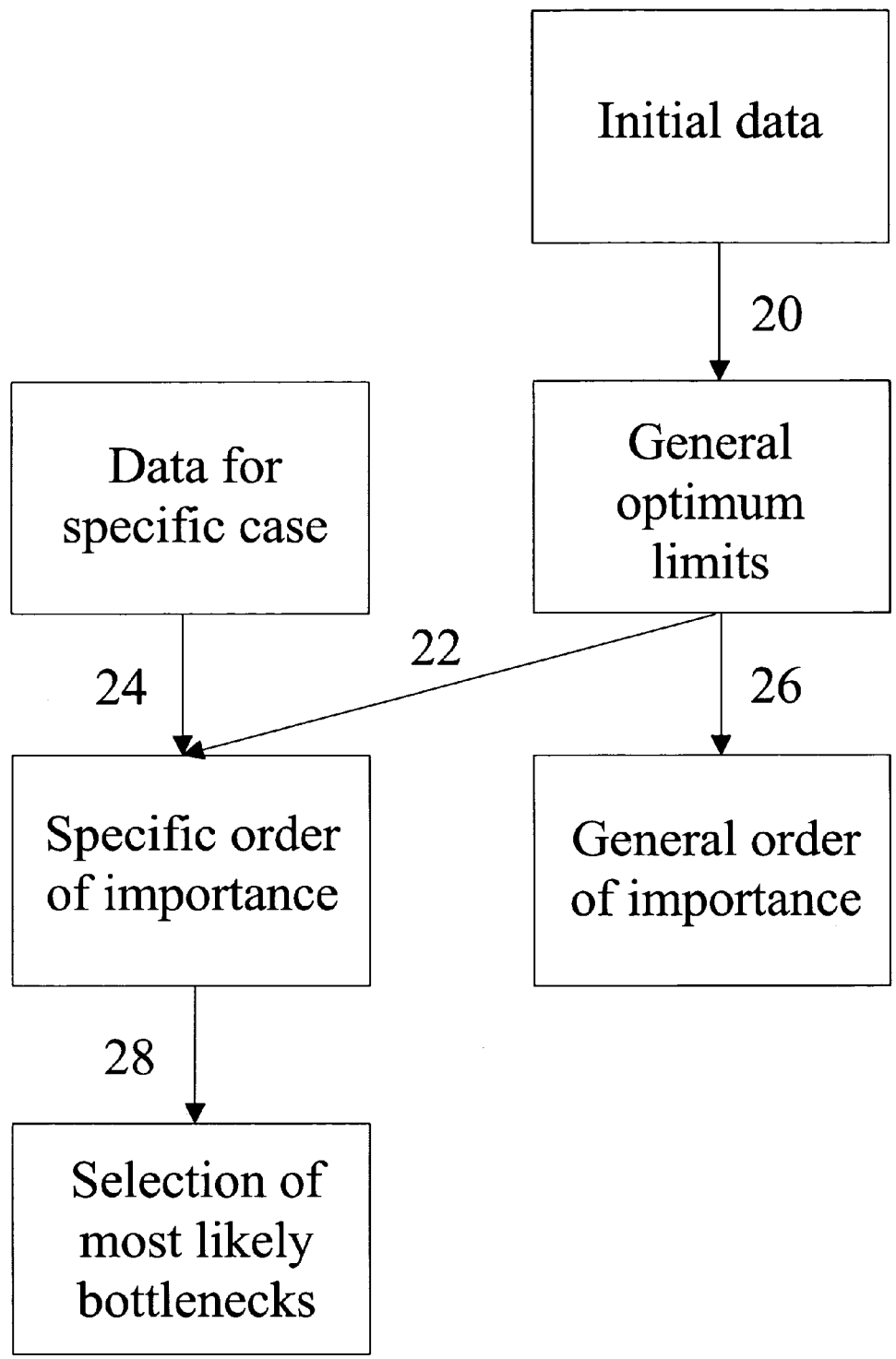
FIG. 2 shows the main steps of the method of the current invention as a flow chart
Figure 3:
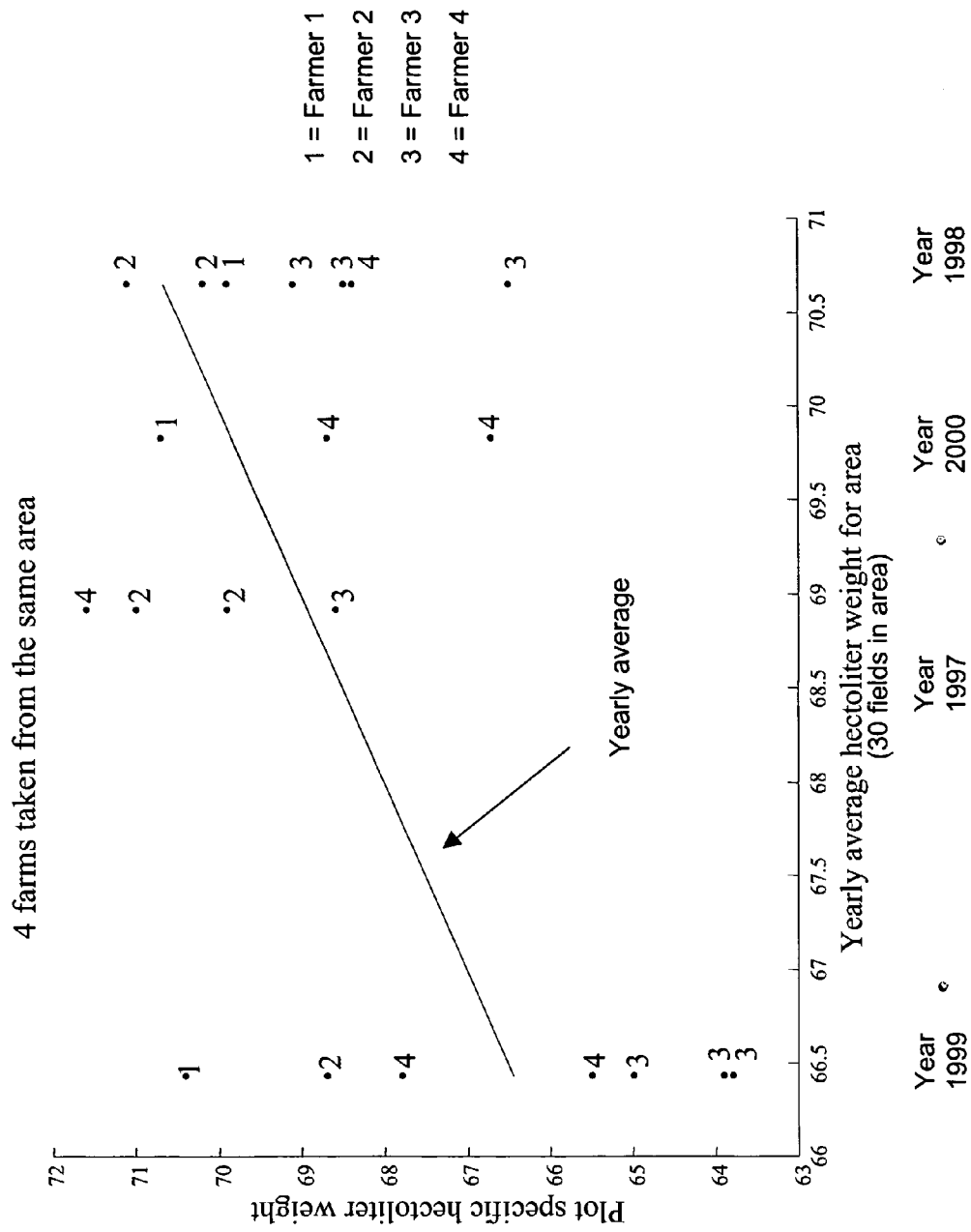
FIG. 3 shows the result of a stability analysis comprising the provision of a linear model indicating the area-specific annual variation and the comparison to the deviation from the average of said area by a single farmer at areas with different productivity.

After these steps, also feedback about the factors having an influence on production quality and/or volume may be provided on the basis of the independent factors. Optionally at step (i) also data collected from outside the information and/or data acquisition systems of the production site is organized to a data bank of said system, FIG. 2 shows the main steps of the present invention. First, general optimum limits for explanatory variables are calculated 20 from the initial data. These variables can be sorted based on their relative significance in general data. This means the most limiting factors of production in larger areas like, e.g., counties can be identified from this list. The general optimum limits 22 combined with data for a specific case (e.g. one plot) are used to order the explanatory variables in the specific case. The most significant variables are most likely the ones causing the bottlenecks in production. In step 20 the outlier detection and removal is done. The optimum limits are determined according to one of several suitable algorithms as described in the chapter "Basic Analysis of the Information Material". In steps 24 and 26, the sorting is based on one of several criteria as described in the chapter "Processing of the Analysis Results". In step 28, the selection is based on one of several criteria.

Acquisition and Recording of Information

Figure 1:
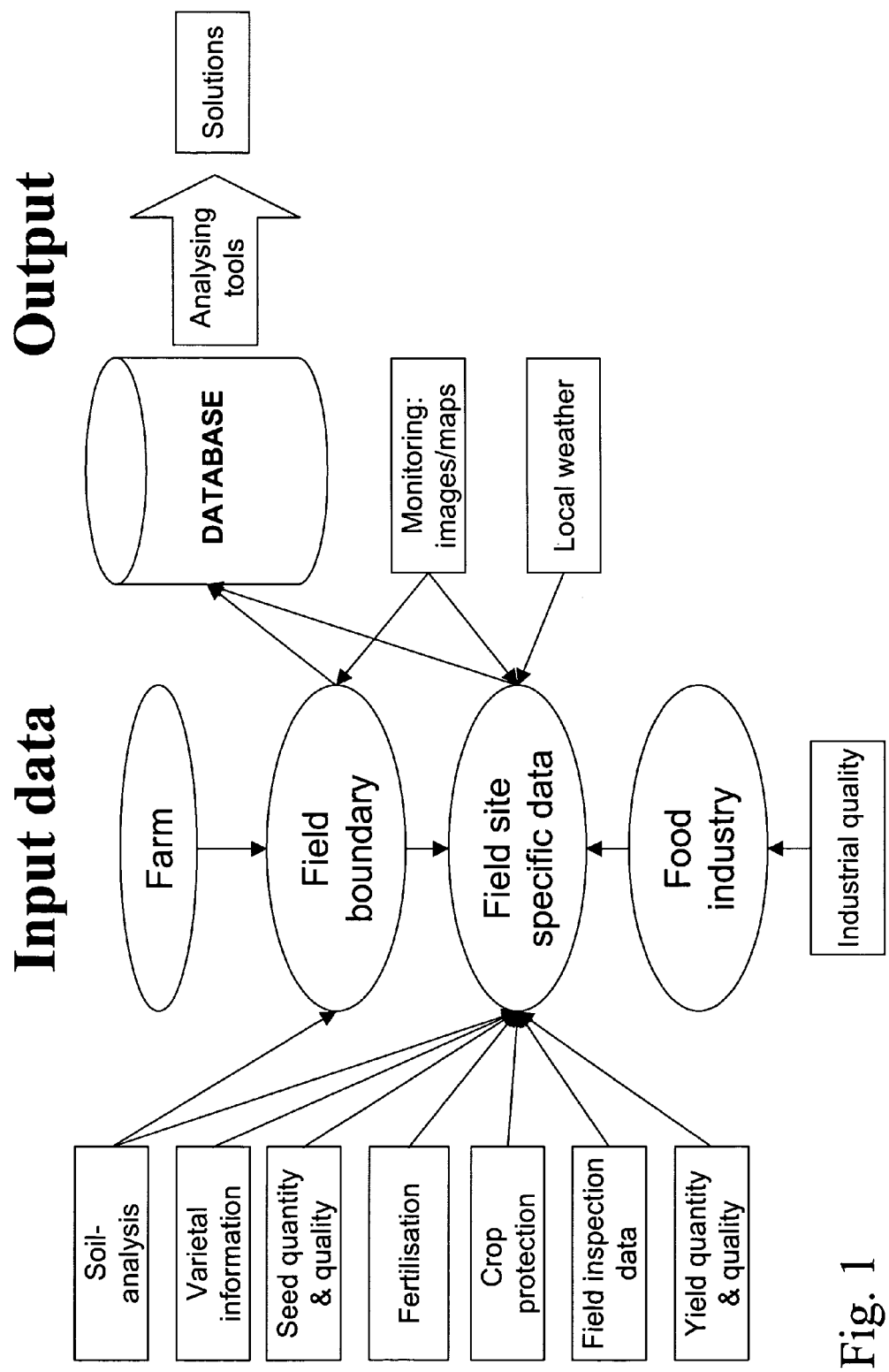
FIG. 1 shows data sources and various useful data and observation results, processing of said data and utilization thereof in the method of the invention.

In the method of the invention, a data network and local information system are used for periodic or continuous collection of site-specific and/or animal-specific data at the production site from land owners, industry and authorities and other information suppliers to be recorded to a data bank (FIG. 1). Such data includes production information, aerial photos, farmer registers, local weather data and other information about the production site or conditions thereof. In the data bank, the records commonly contain information about the location, and normally also the time or date of the data.

The method of the invention comprises several steps, the substantial idea being the combination of abundant site-specific data collected from several sources to obtain very extensive information material about the particular phenomenon, and the analysis thereof to determine optimum conditions for production. The method must be able to process deficient and partly erroneous information material readily, since already existing ample data that is not necessarily collected particularly for this system is used.

In this context, production site refers to any applicable defined area, group, or unit relevant to the industrial field of the invention. The production site may for instance be a farm, field, section of a field, and further specified area(s) of said section, a farm animal, group of farm animals, progeny, or a place in the stable or animal shelter, such as animal stall. Such a production site preferably comprises an information and/or data acquisition system, either computer-assisted or any other convenient arrangement for collecting or recording information. Data collected from production sites normally refers to various data or findings collected therefrom, including observations on the vegetation and environment of the production site, measurable data such as data about the fertility of the soil or data about nutrient contents of grains, also other data including information about the plant varieties used. This data may be recorded in expert systems of production sites, the data being collected and recorded by means of any convenient system(s) as described for instance in the document U.S. Pat. No. 5,566,069. Such systems are commonly commercially available. In general, in this description the expression "expert systems of production sites" refers to any system or arrangement, such as computer or data network assisted system for recording data from production sites. Generally in the system of the invention, the data collected is analyzed in the following manner.

Provision of the Information Material to be Analyzed

Essential data for the phenomenon in question, or alternatively all data relative to a specific location, and possibly to a certain moment or period of time is selected from the data base as input data to get a single record.

The significance of such input data is normally estimated by an expert. According to a preferable embodiment, only factors having the greatest significance for the industry are selected from total data (for instance potato harvest volume, and the per cent purity relative to the total harvest), all other known factors describing in more detail the purity of the harvest being excluded from the analysis, including various damage types unless they are not a separate issue. In another situation fluid tension breaking may be the object of interest, and in this case relevant data is included into the analysis.

Selected input data is divided into dependent factors Y and independent factors X, said dependent factors Y being quantitative and independent factors X being either qualitative or quantitative. Dependent factors Y are normally factors, the values of which are for some reason interesting, exemplified by variables describing the volume, or quality of the harvest. Independent factors such as fertilization, plant protection, water supply, species and varieties to be cultivated, soil processing, soil type, or selection of cattle feed, mineral additives or pasturing, are any factors present in the information material possibly having an influence on the dependent factors. In other words dependent factors are consequences of interest, independent factors being potential causes or factors correlating with dependent factors.

Basic Analysis of the Information Material

The selected data is divided into groups on the basis of qualitative independent factors. Each group is analyzed independently as follows. Clearly deviating observations are excluded, and adequate values of the dependent factors are determined. For instance, the adequate value of Y may be defined as "not more than 5% below the maximum value found". Thereafter, the range of the independent factor allowing obtaining at least one corresponding Y that is adequate is determined. The found range of X will be called hereafter the optimum range of X with respect to Y.

In this context, the term optimum normally refers to a range providing in practice a result that is substantially as good as the best result of the information material. For each pair of dependent/independent factors, points are selected from the information material, these points defining a shell under which all other points of the information material lie, when the dependent factor is represented by the ordinate and the independent factor is represented by the abscissa. It is for instance possible to select all points that are outside the optimum range. It is preferable to choose 2–3 of the most limiting factors for a production period. Then for each pair of dependent/independent factors, the range (hereafter the "optimum range") in which the independent factor may vary is determined, said range being such that the location of the corresponding point on the shell is still acceptable. This may be accomplished for instance using the method based on the article of Schnug, E, Heym, J and Murphy, D having as title: Boundary Line Determination Technique (BOLIDES), in Site-specific management for agricultural systems, 1995, pages 899–908. Other suitable methods may also be used. The selected adjustable independent factors may comprise factors having importance to production, logistics, environment, or costs in agriculture or related industrial fields.

Determined independent factors X are arranged according to the order of significance relative to the dependent factors Y. Order of significance is preferably based on the distance of the independent factors of a single record from the optimum range. One or more independent factors X limiting production are preferably selected on the basis of selected criteria among factors that are outside the optimum range. It is then determined how the selected independent factors X deviate from the optimum range.

Processing of the Analysis Results

If interest is directed to conclusions describing the total information material, the result will be a report allowing the expert to consider the factors that are most often outside the optimum range. In this case, the analysis method acts as the processor of already existing information. For creating said report, for instance the method (BOLIDES) described in the above article may be used, this method calculating the proportion of observations optimum for each independent factor, and arranging said independent factors to an increasing order according to said proportion. In this context, the term 'report' refers to the result of the analysis in any form that may be read or interpreted, for instance electronic data or a paper print.

Another way to interpret the results of the basic analysis of the information material is to find out for each independent factor the distance from the optimum range (and the direction of the deviation) at a certain location (e.g. field section). The distance may be determined in several ways, for instance as the distance of the independent factor from the nearest boundary of the optimum range, as the ratio of said distance to the size of the optimum range, or as the distance of the point corresponding to an independent factor on the shell from the maximum of the information material. Independent factors used in the analysis may be arranged according to said distance to an order of significance, thus clearly presenting most probable problems. This information may be supplied as such to the customer, and thus the customer is responsible for the design of correcting measures. According to one embodiment of the invention the suitable correcting procedures may be directly suggested to the customer. Preferably, the factors that may be corrected are economically significant factors for the field or industrial field, e.g. agriculture or any related industrial field in question.

In any case, the analyses are carried out automatically after the data to be used in the analyses are determined (see Provision of the Data to be Analyzed).

One way to compare the efficiency of production and thus determine independent factors limiting production is to apply for instance linear stability analysis wherein a linear model presenting the area-specific annual variation is provided on the basis of gathered information material and the deviation from the average of said area by a single farmer is compared to areas with different productivity. This may be achieved with the method based on the article on Finlay, K. W., and Wilkinson, G. N.; The Analysis Adaptation in a Plant-Breeding Programme, Aust. J. Agric. Res. 1963, 4: 742–753). Application of other non-linear models in similar way is also possible in cases where the behavior of independent properties of interest is not covered by a linear model. These different kinds of models and usage thereof are known for a person skilled in the art.

Finally, feedback on the basis of said analysis and the results thereof may be provided, said feedback being a solution or instructions concerning factors that affect the quality and/or volume of production, or for adjusting or influencing said factors. Such feedback may be furnished via the information network, although other ways of furnishing feedback are also useful. Feedback is preferably furnished to the production site or industrial field related to said production site, more preferably to an information system of the production site or industrial field related thereto. Feedback may also be furnished to any other place or system. As used herein the terms "data network" or "information network" refer to any data network known in the art, such as, but not limited to, Internet, wireless data networks, cellular networks, local area networks or like.

The method of the invention makes processing of information material particularly effective. In addition to the fact that factors limiting production are recognized with the method, studies may be focused on problems indicated by the method.

EXAMPLES

Comparative Example

Soil properties and yields from 514 plots of Barley (variety Scarlett) from years 1997–2002 were analyzed according the system. All data rows were useable, and all the data in the rows was used by the system. The rows contained 8496 individual data entries (23% of them were missing values). The system was able to utilize all remaining 6547 data points.

For comparison purposes a classification tree algorithm (from Systat analytical software) was used. In the latter case only 37 rows (5%) of data were acceptable for the analysis, because a clear majority (477) of the data rows had some data missing. Only 444 individual data entries out of the 6547 available (7%) were useable by the classification tree algorithm.

The present invention is now illustrated by some working examples.

Example 1

In a preferable embodiment of the invention, data acquisition and combination were carried out as follows:

During a test lasting for three years, barley was grown in various parts of Finland in several cultivations. Recognition data of farm and field section data of the cultivations were obtained from the IACS statistics (Integrated Administrative and Control System). Further, field section limits of each section were obtained from the information service center of the Ministry of Agriculture and Forestry in digital form. Thereafter, fertility data of each field/field section of the cultivation were determined, that is, the nutrient analysis of soil was carried out by determining phosphorus, potassium, calcium, magnesium, manganese, zinc and copper contents thereof, in addition to the pH value and the soil type. Based on the data of the cultivation journal of the farmer, section-specific information about the barley variety seeded, preliminary plant data from the past five years, seeding density of the barley variety, fertilization and plant protection measures (date of application, preparation and the amount used), moreover, the total harvest volume per hectare was gathered. Accordingly, reception data, that is, quality factors (including starch percentage, protein content, weight of one thousand seeds, weight of a hectoliter) indicating marketability of harvests, marked with site recognition codes, supplied as raw materials for industry, data about the amount supplied (kg/ha), and classification data about the suitability of barley to be used as malt barley, enzyme barley, starch barley or feed barley, were combined to get a site-specific record.

All data were provided with a site recognition codes, or in some cases with coordinates, and then combined to get a site- and time-specific record. Data marked with site recognition codes from site-specific records of various production sites were transferred to an electronic data bank of the inventive system.

Example 2

In another preferable embodiment of the invention, starch yield of potato production was optimized as follows.

At Kokemäki river valley, potatoes for starch production were grown in 200 field sections for three years. Cultivation journal records, including soil type, soil fertility (nutrient contents of the soil, such as P, K, Ca, Mg, Mn, Zn, Cu), soil pH value, seeding density, preliminary plant data, information about plant protection, local weather, and volume of harvest, for each field sections were provided with site recognition codes permitting to combine desired data to obtain a site-specific record. Further, reception data, that is, quality data of harvests, marked with recognition codes, supplied as raw materials for starch industry was gathered, the data being the tuber harvest of the farmer (tons/ha), starch percentage (%) thereof, and accordingly, the starch yield (kg/ha), provided with corresponding site recognition codes. Thereafter, fertility data of potato fields, that is nutrient contents (P, K, Ca, Mg; Mn, Zn, Cu), soil pH value, and information about starch percentages, and starch yields of the potato harvests were selected from site-specific records. Based on this information, optimum ranges for individual nutrients were determined to meet, according to the information material, the requirements for achieving as high starch contents and starch yields as possible for fertility values in the optimum range (Table 1).

TABLE 1

Characteristics of soil fertility optimum for starch harvest and industrial processing quality determined according to the method of the invention

| Fertility property of cultivation soil | Optimum range of the property (mg/l of soil) for starch yield (kg/ha) | Optimum range of the property (mg/l of soil) for starch content (%) of tubers |
|---|---|---|
| P | 22–50 | 20–52 |
| K | 67–119 | 45–121 |
| Ca | 969–1606 | 530–1674 |
| Mg | 100–153 | 56–159 |
| Mn | 10–24 | 10–52 |
| Zn | 1.2–2.5 | 1.0–3.2 |
| Cu | 4–10 | 3–9 |
| Mg/K | 0.76–2.35 | 0.59–2.37 |
| Mg/Ca | 0.07–0.13 | 0.06–0.17 |
| pH | 5.6–6.8 | 5.1–6.9 |

Thereafter, the number of the field sections covered by the information material meeting the requirement of an optimum production environment for single nutrients was determined, expressing the result as a ratio. The higher the number of potato field sections in an optimum range determined for a single nutrient (high ratio), the lower was the probability for said nutrient to unquestionably limit the production among farms and vice versa (Table 2).

TABLE 2

Proportion of field sections with the characteristics of soil fertility on optimum levels for starch yield and industrial processing quality. FIGURES indicate the proportion of sections on optimum levels of all included sections.

| Fertility property of cultivation soil | Proportion of fields having said property in an optimum range for starch yield (kg/ha) (%) | Proportion of fields having said property in an optimum range for starch content (%) of tubers (%) |
|---|---|---|
| P | 60 | 68 |
| K | 53 | 71 |
| Ca | 42 | 72 |
| Mg | 43 | 71 |
| Mn | 37 | 73 |
| Zn | 49 | 69 |
| Cu | 67 | 80 |
| Mg/K | 64 | 76 |

TABLE 2-continued

Proportion of field sections with the characteristics of soil fertility on optimum levels for starch yield and industrial processing quality. FIGURES indicate the proportion of sections on optimum levels of all included sections.

| Fertility property of cultivation soil | Proportion of fields having said property in an optimum range for starch yield (kg/ha) (%) | Proportion of fields having said property in an optimum range for starch content (%) of tubers (%) |
| --- | --- | --- |
| Mg/Ca | 54 | 75 |
| pH | 57 | 78 |

Based on the analysis results obtained, starch yield of the field sections included in the test were most often limited by low manganese, calcium and magnesium concentrations of the soil. For more than half (57–63%) of the fields, said fertility factors were outside the optimum range relative to starch formation. To correct the nutrient values, the system provided said potato field sections with fertilization recommendations on the basis of site codes; particularly additional fertilization recommendations with respect to manganese, magnesium and calcium. Said additional fertilization was carried out according to these recommendations, and field observations showed that the volume of the harvest increased by about 7 tons/ha, the starch content being 0.3–0.8 percentage points higher, that is, the total starch yield increased about by 21–56 kg per hectare.

Moreover it was found out that the starch content was limited by phosphorus and zinc contents of fields. More than 30 percent of the farmers grew starch potato in field sections wherein the phosphorus content of the soil was below the determined optimum limits thereof (20–50 mg of phosphorus per liter, 1.0–3.2 mg of zinc per liter). The system provided the farmers with field section-specific fertilization recommendations, particularly additional fertilization recommendations with respect to phosphorus and zinc, and thus phosphorus and zinc were applied in various amounts into the planting furrow for potatoes. On the basis of field observations, the percentage of starch of the potato harvest increased by about 0.3–0.5 percentage point, and thus the total starch yield increased about by 21–35 kg per hectare.

Example 3

In a preferable embodiment of the invention, characteristics of silage for milk cows were optimized as follows.

An extensive test cultivation series was carried out for three years, cultivating grass for silage on twenty thousand (20 000) field sections. Factors having an influence on the efficiency of the production of grass silage, and also factors reflecting the nutritive value thereof having significance with respect to milk cow business (i.e. for milk production) were measured. Such factors include the mineral content of silage (e.g. K, Ca, Mg, P, Zn, Mg, Mn), harvest time and number of reapings, energy content of the silage produced and units reflecting the digestability thereof. Each of the determined factors was marked with of the side recognition code field, and the data thus marked were combined to obtain a site-specific record.

Next, optimum range for each important mineral of the harvested silage was determined with respect to the amount of the silage produced, and nutritive quality thereof.

Thereafter, the number of the fields producing highest silage volumes and nutritive qualities with respect to single minerals was determined. Ratios obtained were listed according to an ascending order for comparison of the mineral contents. This showed that the potassium concentration in the silage varied more strongly than that of other minerals depending on the harvest time and number of reapings, and thus, relatively speaking, potassium is a factor limiting growth more than other minerals.

Next, optimum potassium content of the silage was determined for the greatest amount of the silage harvest, raw protein content, and raw protein yield thereof, silage unit value, silage unit yield, protein digested in the small intestine and protein balance of the rumen (Table 3). Limit value range of potassium content covering potassium values measured for all quantitative and qualitative properties of silage was determined.

Based on this example, the potassium content of the silage should be 25–27 g/kg of the dry matter thereof.

TABLE 3

Optimum limit values of the potassium content of silage grass for the amount of silage and nutritive value thereof

| Silage property | Optimum range of the potassium content of silage, g/kg of dry matter |
| --- | --- |
| Amount of harvested silage, kg/ha | 18–27 |
| Raw protein content, % | 19–34 |
| Raw protein yield, kg/ha | 19–33 |
| Silage unit value, SU/kg | 14–33 |
| Silage unit yield, SU kg/ha | 17–29 |
| Protein digested in small intestine | 14–35 |
| Protein balance of rumen | 25–33 |
| Optimum of the K content of silage | 25–27 |

Next, the system determined the number of the field sections reaching the goal set for the potassium content of the silage (25–27 g of potassium/kg of dry matter). Then, the locations of the farms were determined by means of recognition data. Thereafter, silage production data of this successful farm were compared with the corresponding data of the farmers in the neighborhood. Using classification analysis, it was found that harvesting time, and the number of reapings were not optimum among 32% and 54% of the farmers, respectively. Moreover, 23% of the farmers needed additional potassium fertilization.

Example 4

In a preferable embodiment of the invention, site-specific fertilization was carried out using N, P and K nutrients. 252 field sections with spring wheat were aerially photographed, and for each section, characteristic values reflecting the NDVI (Normalized Difference Vegetation Index) were established from these aerial photos. According to said characteristic values, soil samples were taken from different vegetation index zones for soil type, phosphorus and potassium analyses. From corresponding zones, nitrogen contents of wheat grains were determined with a portable NIR analyzer (Zeltex ZX50). Harvest volume was measured site-specifically either by means of a harvest mapping device connected to the combine harvester, or by calculating on the bases of harvest models and NDVI data from aerial photos. Each of the single result (soil type, phosphorus, and potassium contents of soil, nitrogen content of grains and information of the crop) was marked with a site recognition code, i.e. co-ordinates, and the data thus marked were combined to obtain a site-specific record in the memory of a computer.

Then, the spring wheat fields covered by the record were divided to clay soils and mineral soils according to the soil type. Next, with respect to spring wheat crop, optimum ranges of phosphorus and potassium contents of soil and nitrogen content of grains were determined for each soil type.

Then, the number of fields in the optimum range for a single nutrient, e.g. phosphorus, potassium, or nitrogen, or for two or more nutrients, e.g. phosphorus and potassium, phosphorus and nitrogen, potassium and nitrogen, or phosphorus, potassium, and nitrogen was determined.

Phosphorus alone is the factor limiting most significantly the crop for thirty five fields classified as having clay soil (Table 4). For these fields, the system recommended the site-specific use of phosphorus as so-called maintenance fertilization. With respect to other nutrients (nitrogen and potassium), the system recommended the use of fertilizers as an optimum blend relative to crop potential. The system recommended similar potassium and nitrogen fertilization procedures respectively for eight and for five fields. For three fields, the system recommended the site-specific maintenance fertilization with phosphorus and potassium. On the contrary, for 37 fields containing clay soil, none of the studied main nutrients limited the crop, the system thus recommending the use of one NPK nutrient mixture in these fields.

Mineral soil fields comprised 48 sections, for which the system recommended the use of uniformly applied fertilization with all three main nutrients based on the crop potential of said field sections (Table 5). Instead, e.g. potassium or phosphorus alone was clearly the most important factor limiting the crop either in 92 or in 81 field sections. For these sections, the system recommended the site-specific maintenance fertilization with potassium or phosphorus, whereas according to said recommendation, other main nutrients should be applied depending on the crop potential. For two fields with mineral soils, the crop was limited by all three main nutrients. In these two cases, the system recommended for each of the three nutrients the site-specific application of the fertilizers on the basis of both the fertility of the soil, and crop potential.

TABLE 4

Factors limiting spring wheat crop, studied on the basis of the variation of phosphorus and potassium contents of the soil, and nitrogen content of grains for clay soils. Fertilization depending on the crop potential and controlling nutrient is shown below the column. Altogether 88 field sections were included in the study.

| Limited by P (<8.2 mg/l) | Limited by K (<139 mg/l) | Limited by N (<2.2% of N in grains) | Limited by P and K | Limited by P, K and N |
|---|---|---|---|---|
| 35 fields P; site-specific | 8 fields K; site-specific | 5 fields N; site-specific | 3 fields PK; site-specific | — NPK blend*) |

*)Optimum NPK fertilizer blend applied according to the crop potential.

TABLE 5

Factors limiting spring wheat crop, studied on the basis of the variation of phosphorus and potassium contents of the soil, and nitrogen content of grains for mineral soils. Fertilization depending on the crop potential and controlling nutrient are shown below the column. Altogether 259 field sections were included in the study.

| Limited by P (<7.0 mg/l) | Limited by K (<203 mg/l) | Limited by N (<2.1% of N in grains) | Limited by P and K | Limited by P and N | Limited by P, K and N |
|---|---|---|---|---|---|
| 81 fields P; site-specific | 92 fields K; site-specific | 7 fields N; site-specific | 24 fields PK; site-specific | 5 fields PN; site-specific | 2 fields NPK; site-specific |

Example 5

In a preferable embodiment of the invention, the hectoliter weight of barley was optimized as follows.

During the growth periods of the years 1997–2000, barley was cultivated in Finland at various locations, the total number of the fields sections cultivated being 400. Recognition data of farm and field section data of the cultivations were obtained from the IACS statistics (Integrated Administrative and Control System). Based on the records of the cultivation journal, cultivation data for each field section were gathered. This data include fertility data of the soil type (P, K, Ca and pH of the soil), barley variety, seeded amount and time of seeding, fertilization and plant protection measures (the amount used and the date of application according to growth phase, and characteristics), time of harvest, crop volume and quality factors of the crop. In addition, local daily weather data were gathered.

All data were provided with a site recognition code, and then combined to get a site-and time-specific record. Data marked with site recognition codes from site-specific records of various production sites were transferred to a data bank of the system.

The system provided the farmers with section-specific recommendations for optimizing the volume of the crop and quality thereof with respect to the fertilization of said barley, plant protection, etc. according to the same method described in Examples 2–4.

By cultivation areas, the farmers were able to compare the efficiency of their activities for various plant varieties against those of other farmers (benchmarking). This was done by applying the stability analysis of Finlay-Wilkinson (Finlay, K. W. and Wilkinson, G. N. 1963) by establishing an average of various properties indicating annual variation thereof, specific to a cultivation area. FIG. 2 shows a straight line presenting the variation of the hectoliter weight of barley from 30 field sections, typical for a certain area. In the Figure, points relative to the same farmer in the same year describe different fields sections of that particular farmer. According to reference results, farmers 1 and 3 were able to produce in unfavorable year's hectoliter weights that were better than those of other farmers, and even in favorable year's weights corresponding to the average. Instead, hectoliter weights of barley crops of the farmer no. 4 were always clearly lower than the average, independent of the growth period. More detailed analysis of the case showed that the barley variety selection of the farmer no. 4 was not the best possible. Further analysis among the farmers of the area by applying the stability analysis of Finlay-Wilkinson showed that the farmer no. 4 should select the variety used by the farmer no. 1 for clay soils and the variety used by the farmer no. 3 for organic soils. New comparison carried out in years 2001 and 2002 showed that the mean hectoliter weights of barley attained by the farmer no. 4 were improved as judged by cultivation certainty.

Example 6

In a preferable embodiment of the invention, the canned pea harvest was optimized as follows.

Soil composition of 20 field sections were measured before the seeding procedure of the actual cultivated plant by using an EM 38 device and a soil sampler having an automatic GPS localization, connected to a four wheel motorbike. The data were collected for several parts of the field. The data collected were marked with site recognition codes, or co-ordinates, and saved to the memory of a computer carried by the four wheel motorbike. Later, the data thus marked were combined to obtain a site-specific record in the memory of the computer.

At the beginning of the flowering of the pea fields, the vegetation of the corresponding 20 field sections used for the production of canned peas was aerially photographed by using false-color technique. From these photos, recognition data characteristic for the growth differences of NDVI (Normalized Difference Vegetation Index) vegetation were established for each section. In addition, large stones possibly hampering the future harvesting were recognized, and seeding direction of peas for threshing was determined from the photos. Moreover, the condition and direction of the roads leading to the pea fields were determined from the photos. Each single data (NDVI, location of the stones hampering harvesting, seeding direction of peas and the condition and direction of the roads) were marked with site recognition codes, or co-ordinate, and the data thus marked were combined to obtain a site-specific record in the memory of a computer. In addition, cultivation journal records of each field section, such as soil type, soil fertility, soil pH value, seeded pea variety, seeding density, date of seeding, preliminary plant information, data about the presence of pests, data about plant protection, and local weather data were provided with site recognition codes, and the data thus marked were combined to obtain a site-specific record.

Later, threshing machines of the canned pea producer were provided with information about the ripening order of the pea varieties used by the system in file form for each field section on the basis of the soil properties, local weather data, predicted tensitometric figures, probability of variation of the tensitometric figures of the field sections, location of stones hampering the pea harvest, and the direction of threshing corresponding to that of seeding. Moreover, the system indicated the condition of the roads at harvesting time. As the result of the procedure, the logistics and performance of harvesting peas for canned pea production were improved.

Example 7

In a preferable embodiment of the invention, the tracing of production was accomplished as follows.

During the growth period of the year 2000, oats were cultivates in different areas in Finland to obtain food-quality oats, the total number of field sections cultivated being 364. Recognition data of farm and field section data of the cultivations were obtained from the EU IACS statistics (Integrated Administrative and Control System). Based on the records of the cultivation journal, cultivation data for each field section were gathered. This data includes fertility data of the soil type (P, K, Ca and pH of the soil), oats variety, seeded amount and time of seeding, fertilization and plant protection measures (the amount used and the date of application according to growth phase, and trademarks), time of harvest, crop volume and quality factors of the crop. In addition, local daily weather data were gathered. During the harvest, farmers took representing preliminary samples specifically for each field section, and from said samples, any possible risk factors for the oats quality were assayed. They include mycotoxins, e.g. ocratoxins produced by *Fusarium, Aspergillus* and *Penicillium* moulds. In addition, heavy metal, e.g. cadmium contents of said preliminary samples and pesticide residues were analyzed.

All data were provided with a site recognition code, and then combined to get a site- and time-specific record. Data marked with site recognition codes from site-specific records of various production sites were transferred to a data bank of the system.

Next, quality parameters describing quality risk factors of oats were selected from said site-specific records. Based on classification analysis, those preliminary samples having mycotoxin levels and heavy metal concentrations higher that the accepted highest values, were identified.

According to the analysis, five oats batches with mycotoxin levels higher that the acceptable highest values were found. Based on the site recognition codes, field sections of the preliminary samples and cultivations of the field sections or farms were first recognized. It turned out that all five field sections belonged to the same farm, and moreover, local weather conditions around the farm had been rather favourable for the formation of mycotoxins during the growth and harvesting period in question. In addition, also according to the seeding density information, rather dense vegetation was expected, possibly increasing the risk of mycotoxin formation. Further, the harvest volume of the field sections was considerably higher than the average compared to other field sections in the data bank, further increasing the risk of mycotoxin formation under the particular growth conditions. Oats harvest from the subject farm was not accepted for food applications. A decision was made to improve data acquisition from preliminary samples for the next growth period by carrying out mycotoxin analysis thereof only in case of similar weather conditions of the harvesting period and high harvest volumes.

On the basis of the analysis, two preliminary sample data for oats were found suggesting unacceptably high pesticide residues. By means of recognition data, field sections were traced, said sections belonging to two different farms. Thereafter, the cultivation data of the field sections were analyzed, the results indicating that on both farms, the same new fungicide still being in the test phase, yet recently put on the market to combat the *Drechslera avenae*-disease of oats had been used. The preparation was not used on other farms of the information material. Moment of the treatment of the two traced preliminary samples with the pesticide were analyzed and compared, and then compared with corresponding treatments with different pesticides on other farms. It was decided to extend the time interval between the moment of use of the new fungicide and the moment of harvest, and moreover, to somewhat lower the recommended amount for application of said pesticide. Oat harvests from said field sections were not used for food applications On the basis of the analysis, four preliminary sample data for oats were found suggesting unacceptably high cadmium concentrations. By means of recognition data, field sections were traced, said sections belonging to two different farms, one field section on one farm and three field sections on another farm. On the basis of further analysis it was found that on both farms, the same oats variety was cultivated, the soil of the farm was relatively acid and phosphorus poor, relatively abundant phosphorus fertilization was used in these field sections, the origin of the fertilizer in association with the acid soil probably being the cause of the elevated cadmium concentrations in the oats harvest. In addition, the cultivated variety tended to accumulate cadmium in the grains thereof. It was found out that similar fertilizers were also used on other farms where, however, the pH of the soil was considerably higher and cultivated varieties were not as liable to accumulate cadmium. The oat harvests from these two farms were not used for food applications. The farms were given the advice to treat their fields with lime and to select an oats variety less sensitive to cadmium, and also to pay attention to applied amounts of phosphorus fertilizers and the origins thereof.

Example 8

This example describes a procedure to select a fertilizer which has got optimal nutrient ratios to a specific field using the current invention.

A large series of experiments was established in Finland in 1998–2002 in which spring barley was grown in numerous fields. The identification codes (field ID) for the trial fields were adopted from the Intergated Administrative and Control System of European Union. A soil sample was taken from each field in order to analyze the nutrient status of the fields. Contents of phosphorus, potassium, magnesium were analyzed from the soil samples as well as the soil type and pH. Information on the name of barley variety, sowing density, fertilizer type and rate per unit of area, yield and yield parameters like specific grain weight and protein content of grains was collected from farmer's diary for each year. The information was related to field ID and combined into a data record. Data records from all the trial fields were imported into a Geographical Information System (GIS).

The data collected was analyzed in order to find out optimal growing conditions for each barley variety. The data was classified by the system into three classes according to the soil type analyzed from the soil samples. The system defined an optimal range for each growth parameter listed in the previous paragraph (soil sample analysis data+sowing density). Defining the optimal range for phosphorus is used as an example. At first, the optimal range for yield and grain weight was defined as follows: the values of these parameters were more than 95% of the maximum observed in the data. The optimum range for the protein content was 10.5–11.5% which is set by the malting industry. Next, the system records the soil phosphorus contents from the cases in which yield, specific grain weight or protein content was in their optimal range. The result from the second step was three different phosphorus ranges. Finally, the phosphorus range which was common to all the three ranges defined in the second step was determined to be the optimum range of soil phosphorus content. These three steps were repeated for all the other growth parameters Barley variety Saana looked like to be most suitable for growing in clay soils as its' yield was higher in clay fields than in the other soils. The optimal growth parameters were sowing density 480–530 germinating seeds per $m^2$, soil P content was 5–9 mg/L soil, soil K content 150–190 mg/L, soil Mg content 250–470 mg/L. Barley variety Kustaa performed better in sandy soils and the optimal parameters for Kustaa were sowing density 470–500 germinating seeds per $m^2$, soil P content was 8–16 mg/L soil, soil K content 110–170 mg/L, soil Mg content 80–180 mg/L.

The analysis data was applied in Kemira GrowHow's trial farm in Vihti, Finland, in the following way. The GIS-system analyzed the data soil data from the farm. The report showed there were three fields with clay soil most suitable to variety Saana and four fields with sandy soil suitable to Kustaa.

An optimal nitrogen application rate was defined to the clay soil fields according to method of the present invention. The data used to determine the optimal rate was observed in the respective fields earlier. The yields for the three previous years have been 4600 kg/ha, 5300 kg/ha and 5700 kg/ha. Respective protein contents were 13%, 12.9% ja 12%. The yields have been fertilized with 100 kg N/ha, 90 kg N/ha and 90 kg N/ha. The analysis showed the optimal target yield for the fields was 4950 kg/ha and the optimal nitrogen application rate was 77 kg N/ha. Similarly, the optimal nitrogen application range to the fields with sandy soil was 86 kg N/ha. These application rates were adopted to the variety Saana in clay fields and to Kustaa in sandy fields. The soil fertility analysis (conducted by soil laboratory Viljavuuspalvelu Ltd., Finland) showed the requirement for other nutrients was 33 kg phosphorus/ha and 50 kg potassium/ha for Saana. There was no need to apply magnesium to Saana fields according to the soil analysis. The optimal nutrient content ratios in the fertilizer for Saana were 1:0.43:0.65 (N:P:K) resulting 77 kg N/ha, 33 kg P/ha and 50 kg K/ha nutrients in total when an optimal rate was applied. The optimal fertilizer for Kustaa fields was 1:0.27:0.35:0.47 resulting 86 kg N/ha, 23 kg P/ha, 30 kg K/ha and 40 kg Mg/ha nutrients in total when an optimal rate was applied.

These recommendations were applied in the farm in 2003. The yield level was good, 6000 kg/ha on average. The grain quality was suitable for malting purposes as targeted.

Some embodiments of the invention are presented above without, however, wishing to limit the invention thereto. The inventive idea may be applied in several ways without deviating from the scope of the appended claims.

The invention claimed is:

1. An automated method for determining bottleneck factors or factors limiting production locally and site-specifically, in agriculture or related industrial fields thereof and for evaluating the mutual significance thereof on the basis of data from a data acquisition system of the a production site, said method comprising the following automated steps:
    (i) organizing data collected from the information and/or data acquisition systems of the production site into a data bank to obtain site-specific records,
    (ii) analyzing said organized data, and determining independent factors having a bottleneck effect or an effect on the production volume and/or quality on the basis of the collected data,
    (iii) determining an order of significance of the independent factors X from the previous step
    (ii) with respect to a particular, or a dependent factor Y, and
    (iv) selecting one or more independent factors limiting the production.

2. The method of claim 1, wherein step (i) further comprises collecting external data outside the information and/or data acquisition systems of the production site into said data bank.

3. The method of claim 2, wherein said external data comprises at least one of the following selected from the group consisting of weather data, satellite pictures, data from the Integrated Administrative and Control System (IACS) data base, and data about industrial fields related to agriculture.

4. The method of claim 1, wherein said site-specific records of step (i) comprise data concerning time.

5. The method of claim 1, wherein the order of significance of the independent factors X obtained in step (iii) is an optimum range with respect to said particular or dependent factor Y.

6. The method of claim 1, wherein in step (iii), said order of significance is based on the proportion of findings in the optimum range to all findings.

7. The method of claim 1, wherein in step (iii), said order of significance is based on the distances of independent factors of a single record from their respective optimum ranges.

8. The method of claim 1, wherein in step (iv) said factor(s) limiting production are selected according to selected criteria from factors lying outside optimum ranges.

9. The method of claim 1, wherein in step (iv) the manner how said factors X deviate from optimum ranges is indicated.

10. The method of claim 1, wherein the selected independent factors comprise factors having importance to production, logistics, environment, or costs in agriculture or related industrial fields.

11. The method of claim 1, said method further comprising
 (v) furnishing feedback concerning factors having an influence on the quality and/or volume on production on the basis of said independent factors.

12. The method of claim 11, wherein said feedback is furnished via data network to the system of the production site and/or related industry.

13. The method of claim 11, wherein said feedback comprises a solution and/or instructions for adjusting the factors having an influence on the quality and/or volume on production.

14. An automated system, comprising at least a computer and data network, for determining bottleneck factors or factors limiting production locally and site-specifically, in agriculture or related industrial fields thereof and for evaluating the mutual significance thereof on the basis the data from the a data acquisition system of a production site, said system comprising the following functions:
 (i) organizing data collected from the information and/or data acquisition systems of the production site into a data bank to obtain site-specific records,
 (ii) analyzing said organized data and determining independent factors having a bottleneck effect or an effect on the production volume and/or quality on the basis of the collected data,
 (iii) determining an order of significance of the independent factors X from the previous step (ii) with respect to a particular, or a dependent factor Y, and
 (iv) selecting one or more independent factors limiting the production.

15. The system of claim 14, wherein step (i) further comprises collecting external data outside the information and/or data acquisition systems of the production site into said data bank.

16. The system of claim 15, wherein said external data comprises at least one of the following selected from the group consisting of weather data, satellite pictures, data from the Integrated Administrative and Control System (IACS) data base, and data about industrial fields related to agriculture.

17. The system of claim 14, wherein said site-specific records of step (i) comprise data concerning time.

18. The system of claim 14, wherein the order of significance of the independent factors X obtained in step (iii) is an optimum range with respect to said particular or dependent factor Y.

19. The system of claim 14, wherein in step (iii), said order of significance is based on the proportion of findings in the optimum range to all findings.

20. The system of claim 14, wherein in step (iii), said order of significance is based on the distances of independent factors of a single record from their respective optimum ranges.

21. The system of claim 14, wherein in step (iv) said factor(s) limiting production are selected according to selected criteria from factors lying outside optimum ranges.

22. The system of claim 14, wherein in step (iv) the manner how said factors X deviate from optimum ranges is indicated.

23. The system of claim 14, wherein the selected independent factors comprise factors having importance to production, logistics, environment, or costs in agriculture or related industrial fields.

24. The system of claim 14, wherein said method further comprising:
 (v) furnishing feedback concerning factors having an influence on the quality and/or volume on production on the basis of said independent factors.

25. The system of claim 24, wherein said feedback is furnished via data network to the system of the production site and/or related industry.

26. The system of claim 24, wherein said feedback comprises a solution and/or instructions for adjusting the factors having an influence on the quality and/or volume on production.

* * * * *